United States Patent
Zhang et al.

(10) Patent No.: US 11,218,573 B2
(45) Date of Patent: Jan. 4, 2022

(54) DATA ROUTING METHOD AND APPARATUS

(71) Applicant: Huawei Technologies Co., Ltd., Shenzhen (CN)

(72) Inventors: Jun Zhang, Shanghai (CN); Xingguo Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 274 days.

(21) Appl. No.: 16/588,495

(22) Filed: Sep. 30, 2019

(65) Prior Publication Data

US 2020/0028944 A1  Jan. 23, 2020

Related U.S. Application Data

(63) Continuation of application No. PCT/CN2017/079128, filed on Mar. 31, 2017.

(51) Int. Cl.
    *H04L 29/06* (2006.01)
    *H04L 12/781* (2013.01)
    *H04L 12/935* (2013.01)

(52) U.S. Cl.
    CPC .............. *H04L 69/18* (2013.01); *H04L 45/52* (2013.01); *H04L 49/3054* (2013.01)

(58) Field of Classification Search
    CPC ...... H04L 45/52; H04L 49/3054; H04L 69/18
    See application file for complete search history.

(56) References Cited

U.S. PATENT DOCUMENTS

| 9,538,505 B2 | 1/2017 | Aminaka et al. |
| 2010/0067426 A1 | 3/2010 | Voschina et al. |
| 2010/0239256 A1 | 9/2010 | Zheng |
| 2012/0057572 A1 | 3/2012 | Evans et al. |
| 2014/0029431 A1 | 1/2014 | Haberland et al. |

(Continued)

FOREIGN PATENT DOCUMENTS

| CN | 101951333 A | 1/2011 |
| CN | 102612166 A | 7/2012 |

(Continued)

OTHER PUBLICATIONS

Korhonen, J., "CPRI over Ethernet/IEEE 1914", Seventh meeting of ITU-T Focus Group IMT-2020, Palo Alto, US, Sep. 6-9, 2016, 14 pages.

*Primary Examiner* — Elton Williams
(74) *Attorney, Agent, or Firm* — Slater Matsil, LLP

(57) ABSTRACT

A data routing method used to implement data routing in a communications system in which a plurality of networks that use different data bearer protocols are integrated is produced. The method includes: a routing apparatus receives data by using an input port, and determines a data bearer protocol attribute of the input port; the routing apparatus determines an attribute of the data based on the data bearer protocol attribute of the input port; the routing apparatus determines based on the attribute of the data, a data bearer protocol attribute of an output port used to output the data; and determines based on the data bearer protocol attribute of the output port, the output port used to output the data, and outputting the data by using the determined output port.

19 Claims, 4 Drawing Sheets

(56) References Cited

U.S. PATENT DOCUMENTS

| | | | | |
|---|---|---|---|---|
| 2014/0348074 A1* | 11/2014 | Lu | ................... | H04W 28/16 |
| | | | | 370/329 |
| 2016/0205589 A1* | 7/2016 | Lorenz | ................ | H04L 12/00 |
| | | | | 370/458 |
| 2016/0316463 A1 | 10/2016 | Liu et al. | | |

FOREIGN PATENT DOCUMENTS

| | | | |
|---|---|---|---|
| CN | 103220193 A | 7/2013 |
| CN | 103281599 A | 9/2013 |
| CN | 103473459 A | 12/2013 |
| CN | 103477701 A | 12/2013 |
| CN | 103875206 A | 6/2014 |
| JP | 2011244096 A | 12/2011 |
| WO | 2013189553 A1 | 12/2013 |
| WO | 2014048866 A1 | 4/2014 |

\* cited by examiner

DATA ROUTING METHOD AND APPARATUS

CROSS-REFERENCE TO RELATED APPLICATIONS

This application is a continuation of International Application No. PCT/CN2017/079128, filed on Mar. 31, 2017, the disclosure of which is hereby incorporated by reference in its entirety.

TECHNICAL FIELD

This application relates to the field of communications technologies, and in particular, to a data routing method and apparatus.

BACKGROUND

With the development of wireless communications technologies, a plurality of networks tends to be gradually integrated. In a future communications system, data of the following plurality of networks can be integrated and transmitted on a same hardware device, for example, data of networks such as a 5th generation mobile communication (5G) low-frequency technology network, a 4th generation mobile communication (4G) technology network, a 3rd generation mobile communication (3G) technology network, a 2nd generation wireless telephone (2G) technology network, a 5G high-frequency technology network, a long term evolution and wireless local area network aggregation (LWA) technology network, a licensed-assisted access (LAA) technology network, and a wireless fidelity (WIFI) technology network. Different networks use different data bearer protocols for data transmission. Data bearer protocols can be classified into the common public radio interface (CPRI) protocol and the Ethernet (ETH) protocol. The CPRI protocol can be used to carry data of networks, such as the 5G low-frequency network, the 4G network, the 3G network, and the 2G network, and the data is collectively referred to as in-phase/quadrature (I/Q) data; and the Ethernet protocol can be used to carry data of the networks, such as the 5G high-frequency network, the LWA network, the LAA network, and the WIFI network, and the data is collectively referred to as Internet Protocol (IP) data.

In an existing communications system, the I/Q data can only be transmitted by using a network device dedicated to transmission of the I/Q data, and the IP data can only be transmitted by using a network device dedicated to transmission of the IP data. In this case, when a data transmission scheme in the existing communications system continues to be used, if a plurality of networks that use different data bearer protocols are integrated in a communications system in the future, a separate-transmission and independent-routing mode needs to be used to separately transmit data that uses different data bearer protocols and that is in the communications system. This transmission process includes a process of separately routing the data that uses different data bearer protocols. In this transmission process, network devices dedicated to transmission of the data need to be deployed for the data that uses different data bearer protocols. Therefore, in the communications system in which a plurality of networks are integrated, deployment costs of the network devices is high and a network architecture is complex, and the separate-transmission and independent-routing mode cannot meet a flexible networking requirement of the future communications system in which a plurality of networks are integrated.

Therefore, there is an urgent need to design a data routing scheme to implement data routing in a future communications system in which a plurality of networks are integrated.

SUMMARY

Embodiments of this application provide a data routing method and apparatus, to implement data routing in a communications system in which a plurality of networks that use different data bearer protocols are integrated.

According to a first aspect, an embodiment of this application provides a data routing method. The method includes receiving, by a routing apparatus, data by using an input port, and determining a data bearer protocol attribute of the input port. The method also includes determining, by the routing apparatus, an attribute of the data based on the data bearer protocol attribute of the input port, where when the data bearer protocol attribute of the input port is the common public radio interface (CPRI) protocol, the attribute of the data is an Internet Protocol (IP) attribute or an in-phase/quadrature (I/Q) attribute, or when the data bearer protocol attribute of the input port is the Ethernet protocol, the attribute of the data is an IP attribute. The method also includes determining, by the routing apparatus, based on the attribute of the data, the data bearer protocol attribute of an output port used to output the data, where when the attribute of the data is the IP attribute, the data bearer protocol attribute of the output port is the CPRI protocol or the Ethernet protocol, or when the attribute of the data is the I/Q attribute, the data bearer protocol attribute of the output port is the CPRI protocol. The method also includes determining, by the routing apparatus, based on the data bearer protocol attribute of the output port, the output port used to output the data, and outputting the data by using the determined output port.

There may be one or more input ports and one or more output ports. The output port and the input port may also be a same port, and a mode of the port may be a duplex mode. Data with a same attribute can be data in one network or data in a plurality of networks, and data with a plurality of attributes is data in a plurality of networks. A plurality of networks may be networks that use a same data bearer protocol attribute, or may be networks that use different data bearer protocol attributes. When data in a plurality of networks is data with a same attribute, the data bearer protocol used by the plurality of networks is a same data bearer protocol. When data in a plurality of networks is data with a plurality of attributes, the data bearer protocol used by the plurality of networks is a plurality of data bearer protocols.

In the foregoing method, the routing apparatus can route the data with one or more attributes, and then the routing apparatus can implement data routing in a communications system of one or more networks, in particular, the routing apparatus can implement data routing in a future communications system in which a plurality of networks that use different data bearer protocols are integrated, so that a flexible networking requirement of the future communications system in which a plurality of networks are integrated is met, a network architecture is simplified, and network device deployment costs are reduced.

In a possible embodiment, the receiving, by a routing apparatus, data by using an input port includes: receiving, by the routing apparatus by using the input port, a first data packet including the data; and after the determining a data bearer protocol attribute of the input port, the method further includes: separating, by the routing apparatus, the first data packet in a separation manner corresponding to the data bearer protocol attribute of the input port to obtain the data.

In this case, the routing apparatus can obtain the data with the attribute corresponding to the data bearer protocol attribute of the input port.

In a possible embodiment, a communication band of the input port whose data bearer protocol attribute is the CPRI protocol includes a first band and/or a second band, the first band is used to receive the data with the IP attribute, and the second band is used to receive the data with the I/Q attribute.

In this case, when the communication band of the input port whose data bearer protocol attribute is the CPRI protocol includes only the first band, the routing apparatus can receive the data with the IP attribute by using the first band. When the communication band of the input port whose data bearer protocol attribute is the CPRI protocol includes only the second band, the routing apparatus can receive the data with the I/Q attribute by using the second band. When the communication band of the input port whose data bearer protocol attribute is the CPRI protocol includes the first band and the second band, the routing apparatus can receive the data with the IP attribute by using the first band, and receive the data with the I/Q attribute by using the second band.

In a possible embodiment, the determining, by the routing apparatus, an attribute of the data based on the data bearer protocol attribute of the input port includes: when receiving the data by using the first band, determining, by the routing apparatus, the attribute of the data as the IP attribute; or when receiving the data by using the second band, determining, by the routing apparatus, the attribute of the data as the I/Q attribute.

In this case, the routing apparatus can determine the attribute of the data based on the communication band used to receive the data.

In a possible embodiment, a communication band of the output port whose data bearer protocol attribute is the CPRI protocol includes a third band and/or a fourth band, the third band is used to output the data with the IP attribute, and the fourth band is used to output the data with the I/Q attribute.

In this case, when the communication band of the input port whose data bearer protocol attribute is the CPRI protocol includes only the third band, the routing apparatus can output the data with the IP attribute by using the third band. When the communication band of the input port whose data bearer protocol attribute is the CPRI protocol includes only the fourth band, the routing apparatus can output the data with the I/Q attribute by using the fourth band. When the communication band of the input port whose data bearer protocol attribute is the CPRI protocol includes the third band and the fourth band, the routing apparatus can output the data with the IP attribute by using the third band, and output the data with the I/Q attribute by using the fourth band.

In a possible embodiment, that when the attribute of the data is the IP attribute, the data bearer protocol attribute of the output port is the CPRI protocol or the Ethernet protocol specifically includes: when there is only the output port whose data bearer protocol attribute is the CPRI protocol, and the communication band of the output port includes the third band, the data bearer protocol attribute of the output port corresponding to the data with the IP attribute is the CPRI protocol; when there is an output port whose data bearer protocol attribute is the CPRI protocol and an output port whose data bearer protocol attribute is the Ethernet protocol, and the communication band of the output port whose data bearer protocol attribute is the CPRI protocol does not include the third band, the data bearer protocol attribute of the output port corresponding to the data with the IP attribute is the Ethernet protocol; or when there is an output port whose data bearer protocol attribute is the CPRI protocol and an output port whose data bearer protocol attribute is the Ethernet protocol, and the communication band of the output port whose data bearer protocol attribute is the CPRI protocol includes the third band, the data bearer protocol attribute of the output port corresponding to the data with the IP attribute is the Ethernet protocol or the CPRI protocol.

In this case, the routing apparatus can determine the data bearer protocol attribute of the output port of the data with the IP attribute based on the communication band and the data bearer protocol attribute of the output port of the routing apparatus, and then determine, based on the data bearer protocol attribute of the output port of the data with the IP attribute, the output port used to output the data with the IP attribute.

In a possible embodiment, the determining, by the routing apparatus, based on the data bearer protocol attribute of the output port, the output port used to output the data specifically includes: when there are a plurality of output ports with the data bearer protocol attribute corresponding to the data with the IP attribute, determining, by the routing apparatus in the plurality of output ports based on a destination address of the data with the IP attribute, the output port used to output the data with the IP attribute; or when there are a plurality of output ports with the data bearer protocol attribute corresponding to the data with the I/Q attribute, determining, by the routing apparatus in the plurality of output ports based on a pre-configured correspondence between an input port used to receive the data with the I/Q attribute and an output port, the output port used to output the data with the I/Q attribute.

In this case, when there is a plurality of output ports with the data bearer protocol attribute corresponding to the data, the routing apparatus can output the data based on the output port that is used to output the data and that is determined in the plurality of output ports with the data bearer protocol attribute corresponding to the data.

In a possible embodiment, the outputting, by the routing apparatus, the data by using the determined output port specifically includes: performing, by the routing apparatus, packet assembly on the data in a packet assembly manner corresponding to the data bearer protocol attribute that is corresponding to the data, to obtain a second data packet including the data; and outputting, by the routing apparatus, the second data packet.

In this way, the routing apparatus can obtain and output a data packet corresponding to the data bearer protocol attribute of the output port, thereby implementing the output of data with one or more data bearer protocol attributes.

In a possible embodiment, the input port whose data bearer protocol attribute is the CPRI protocol is preferentially configured to receive the data with the I/Q attribute; and the output port whose data bearer protocol attribute is the CPRI protocol is preferentially configured to send the data with the I/Q attribute.

In this case, the routing apparatus can preferentially meet a transmission requirement of the communications system for the I/Q data.

According to a second aspect, an embodiment of this application provides a routing apparatus, where the apparatus includes an input port, a processing unit, and an output port. The input port is configured to receive data. The processing unit is configured to: determine a data bearer protocol attribute of the input port; and determine, based on the data bearer protocol attribute of the input port, an attribute of the data received by the input port, where when the data bearer protocol attribute of the input port is the common public radio interface (CPRI) protocol, the attribute of the data is an Internet Protocol (IP) attribute or an in-phase/quadrature (I/Q) attribute, or when the data bearer protocol attribute of the input port is the Ethernet protocol, the attribute of the data is an IP attribute; determine, based on the attribute of the data, the data bearer protocol attribute of the output port used to output the data, where when the attribute of the data is the IP attribute, the data bearer protocol attribute of the output port is the CPRI protocol or the Ethernet protocol, or when the attribute of the data is the I/Q attribute, the data bearer protocol attribute of the output port is the CPRI protocol; determine, based on the data bearer protocol attribute of the output port, the output port used to output the data; and send, to the determined output port, the data received from the input port; and the output port is configured to output the data sent by the processing unit.

In a possible embodiment, the input port is specifically configured to receive a first data packet including the data; and the processing unit is further configured to: after determining the data bearer protocol attribute of the input port, and before sending, to the determined output port, the data received from the input port, separate the first data packet in a separation manner corresponding to the data bearer protocol attribute of the input port to obtain the data.

In a possible embodiment, a communication band of the input port whose data bearer protocol attribute is the CPRI protocol includes a first band and/or a second band, the first band is used to receive the data with the IP attribute, and the second band is used to receive the data with the I/Q attribute.

In a possible embodiment, when determining the attribute of the data based on the data bearer protocol attribute of the input port, the processing unit may be specifically configured to: when receiving the data by using the first band, determine the attribute of the data as the IP attribute; or when receiving the data by using the second band, determine the attribute of the data as the I/Q attribute.

In a possible embodiment, a communication band of the output port whose data bearer protocol attribute is the CPRI protocol includes a third band and/or a fourth band, the third band is used to output the data with the IP attribute, and the fourth band is used to output the data with the I/Q attribute.

In a possible embodiment, that when the attribute of the data is the IP attribute, the data bearer protocol attribute of the output port is the CPRI protocol or the Ethernet protocol specifically includes: when there is only the output port whose data bearer protocol attribute is the CPRI protocol, and the communication band of the output port includes the third band, the data bearer protocol attribute of the output port corresponding to the data with the IP attribute is the CPRI protocol; when there is an output port whose data bearer protocol attribute is the CPRI protocol and an output port whose data bearer protocol attribute is the Ethernet protocol, and the communication band of the output port whose data bearer protocol attribute is the CPRI protocol does not include the third band, the data bearer protocol attribute of the output port corresponding to the data with the IP attribute is the Ethernet protocol; or when there is an output port whose data bearer protocol attribute is the CPRI protocol and an output port whose data bearer protocol attribute is the Ethernet protocol, and the communication band of the output port whose data bearer protocol attribute is the CPRI protocol includes the third band, the data bearer protocol attribute of the output port corresponding to the data with the IP attribute is the Ethernet protocol or the CPRI protocol.

In a possible embodiment, when determining, based on the data bearer protocol attribute of the output port, the output port used to output the data, the processing unit is specifically configured to: when there are a plurality of output ports with the data bearer protocol attribute corresponding to the data with the IP attribute, determine in the plurality of output ports based on a destination address of the data with the IP attribute, the output port used to output the data with the IP attribute; or when there are a plurality of output ports with the data bearer protocol attribute corresponding to the data with the I/Q attribute, determine in the plurality of output ports based on a pre-configured correspondence between an input port used to receive the data with the I/Q attribute and an output port, the output port used to output the data with the I/Q attribute.

In a possible embodiment, the processing unit is further configured to: perform packet assembly on the data in a packet assembly manner corresponding to the data bearer protocol attribute that is corresponding to the data to obtain a second data packet including the data; and accordingly, the output port is specifically configured to output the second data packet sent by the processing unit.

In a possible embodiment, the input port whose data bearer protocol attribute is the CPRI protocol may be preferentially configured to receive the data with the I/Q attribute; and the output port whose data bearer protocol attribute is the CPRI protocol may be preferentially configured to send the data with the I/Q attribute.

According to a third aspect, an embodiment of this application provides a routing apparatus, including a processor, a memory, an input port, an output port, and a bus, where the processor, the memory, and the communications interface communicate with each other by using the bus; the transceiver is configured to receive and send data; the memory stores a program instruction; and the processor is configured to invoke and execute the program instruction in the memory, to perform the method provided in any one of the first aspect and the possible designs of the first aspect.

According to a fourth aspect, an embodiment of this application further provides a computer storage medium, where the computer storage medium stores a computer program, and when the computer program is invoked and executed by a processor, the computer storage medium can perform the method in any one of the first aspect and the possible designs of the first aspect.

DETAILED DESCRIPTION OF ILLUSTRATIVE EMBODIMENTS

In future communications systems, a communications system may include only one network, or may be a communications system in which a plurality of networks is integrated. The plurality of networks may use one data bearer protocol or a plurality of data bearer protocols, for example, the communications system includes one or more of networks such as a 5G low-frequency network, a 4G network, a 3G network, a 2G network, a 5G high-frequency network, an LWA network, an LAA network, and a WIFI network.

In an existing communications system, data bearer protocols can be classified into the CPRI protocol and the Ethernet protocol. A data bearer protocol used for data transmission in networks such as the 5G low-frequency network, the 4G network, the 3G network, and the 2G network is the CPRI protocol, and an attribute of data transmitted in these networks is an I/Q attribute. For ease of description, data with the I/Q attribute is collectively referred to as I/Q data below. A data bearer protocol used for data transmission in networks such as the 5G high-frequency network, the LWA network, the LAA network, and the WIFI network is the Ethernet protocol, and an attribute of data transmitted in these networks is an IP attribute. For ease of description, data with the IP attribute is collectively referred to as IP data below. In a communications system used in embodiments of this application, a data bearer protocol used to carry IP data may be the Ethernet protocol, or may be the CPRI protocol.

In the existing communications system, the I/Q data can only be transmitted by using a network device dedicated to transmission of the I/Q data, and the IP data can only be transmitted by using a network device dedicated to transmission of the IP data. In this case, when a data transmission scheme in the existing communications system continues to be used, if a plurality of networks that use different data bearer protocols are integrated in a communications system in the future, a separate-transmission and independent-routing mode needs to be used to separately transmit data that uses different data bearer protocols. To implement this transmission process, network devices dedicated to transmission of the data need to be deployed for the data that uses different data bearer protocols. Therefore, in the communications system in which a plurality of networks is integrated, deployment costs of the network devices is high and a network architecture is complex. Networking with the separate-transmission and independent-routing mode results in a complex network architecture, and this separate-transmission and independent-routing mode cannot meet a flexible networking requirement of the future communications system in which a plurality of networks are integrated.

Figure 1A:
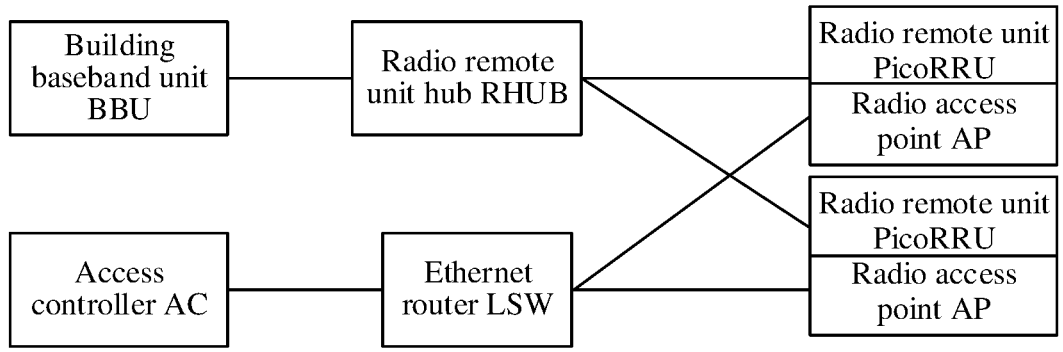
FIG. 1A is a schematic architectural diagram of a network of a communications system in which a WiFi network and a 3GPP network are integrated for transmitting data in a separate-transmission and independent-routing mode.

A communications system in which a WiFi network and a 3GPP network are integrated is used as an example. FIG. 1A shows a network architecture of the communications system in which the WiFi network and the 3GPP network are integrated for transmitting data in a separate-transmission and independent-routing mode. In the communications system in which the WiFi network and the 3GPP network are integrated, the IP data is transmitted in the WiFi network by using a radio access point (AP), an access controller (AC), and an Ethernet router (LAN Switch, LSW), and the I/Q data is transmitted in the 3GPP network by using a building baseband unit (BBU), a radio remote unit (e.g. Pico Radio Remote Unit, PicoRRU), and a radio remote unit hub (RHUB).

Figure 1B:
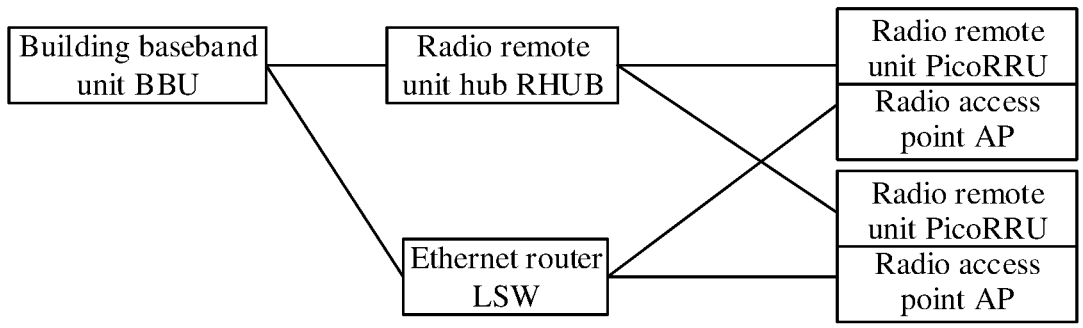
FIG. 1B is a schematic architectural diagram of a network of a communications system in which an LWA network and a 3GPP network are integrated for transmitting data in a separate-transmission and independent-routing mode.

A communications system in which an LWA network and a 3GPP network are integrated is used as an example. FIG. 1B shows a network architecture of the communications system in which the LWA network and the 3GPP network are integrated for transmitting data in a separate-transmission and independent-routing mode. In the communications system in which the LWA network and the 3GPP network are integrated, the IP data is transmitted in the LWA network by using an AP, a BBU, and an LSW, and the I/Q data is transmitted in the 3GPP network by using a BBU, a PicoRRU, and an RHUB.

The embodiments of this application provide a data routing method and apparatus, to implement data routing in the future communications system in which the plurality of networks that use different data bearer protocols are integrated, so that a flexible networking requirement of the future communications system in which the plurality of networks are integrated is met, a network architecture is simplified and deployment costs of network devices are reduced. The method and the apparatus are based on a same application concept. Because a problem-resolving principle of the method is similar to that of the apparatus, mutual reference may be made between apparatus implementation and method implementation, and repeated parts are not described.

Figure 2:
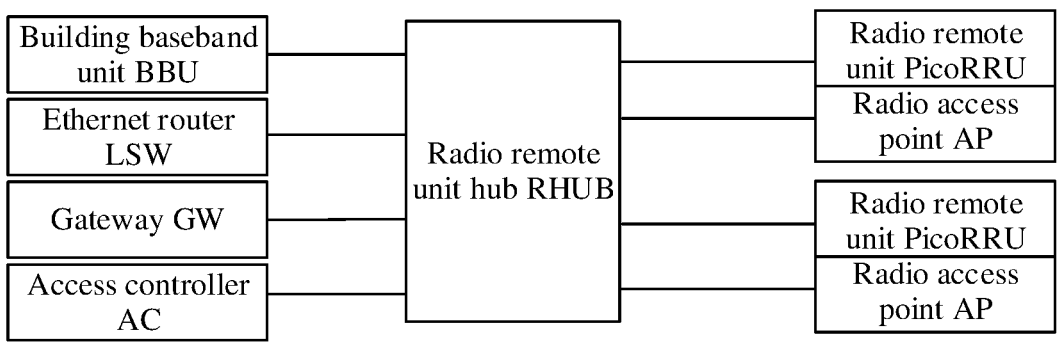
FIG. 2 is a schematic architectural diagram of a data routing system according to an embodiment of this application.

A communications system to which the technical solutions provided in the embodiments of this application is applied may include only one network, or may be a communications system in which a plurality of networks are integrated. The plurality of networks may use one data bearer protocol or a plurality of data bearer protocols, for example, the communications system includes one or more of networks such as a 5G low-frequency network, a 4G network, a 3G network, a 2G network, a 5G high frequency network, an LWA network, an LAA network, and a WIFI network. The technical solutions provided in the embodiments of this application are applicable to the communications system in which a plurality of networks are integrated, for example, a WiFi network and a 3GPP network may be integrated in the communications system, or an LAA network and a 5G low-frequency network may be integrated in the communications system. The technical solutions provided in the embodiments of this application are applicable to a data routing scenario in the communications system, and are particularly applicable to a data routing scenario in the communications system in which a plurality of networks that use different data bearer protocols are integrated. The communications system in which the WiFi network and the 3GPP network are integrated is used as an example. FIG. 2 shows a network architecture of the communications system in which the WiFi network and the 3GPP network are integrated and in which the technical solutions provided in the embodiments of this application are used. In the network architecture, an RHUB is separately connected to network devices in the WiFi network such as an AP, an AC, and an LSW, and is separately connected to network devices in the 3GPP network such as a BBU and a PicoRRU.

The routing apparatus used in the embodiments of this application may route data of one network, or may route data of a plurality of networks. The data of the plurality of networks may be data with a same attribute or may be data with different attributes, for example, one or two of IP data and I/Q data. The routing apparatus may include a route unit (Route), a separation unit (demultiplexer), a packet assembly unit (MUX), and at least one port, for example, the routing apparatus may be an RHUB. When the routing apparatus has only one port, the port is both an input port and an output port of the routing apparatus. The Routing apparatus may be connected to one or more of network devices such as an AC, a gateway (GW), an LSW, and an AP by using ports (including an input port and an output port) whose data bearer protocol attribute is the Ethernet protocol, or connected to one or more of network devices such as a BBU, a PicoRRU, an AC, a GW, an LSW, and an AP by using ports (including an input port and an output port) whose data bearer protocol attribute is the CPRI protocol.

The following describes the technical solutions provided in the embodiments of this application.

Figure 3:
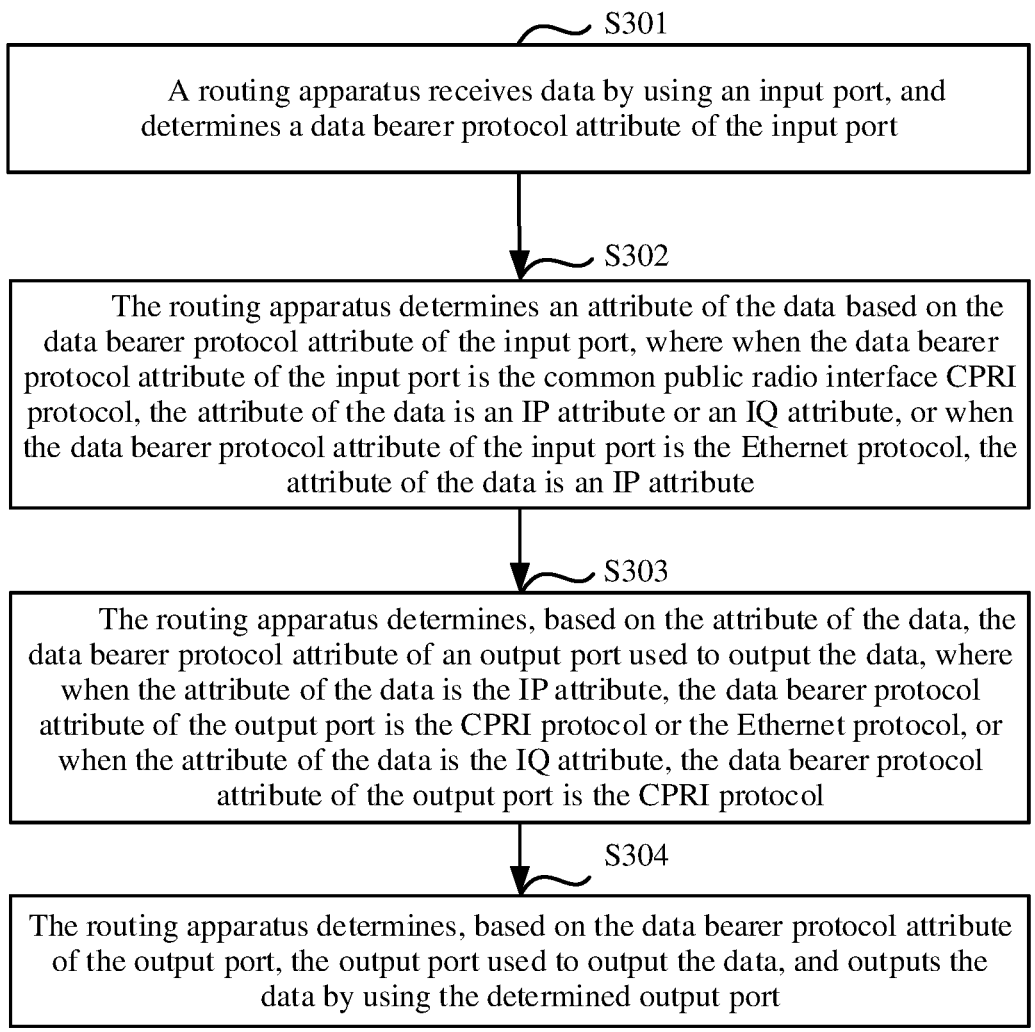
FIG. 3 is a schematic flowchart of a data routing method according to an embodiment of this application.

An embodiment of this application provides a data routing method. As shown in FIG. 3, the method includes the following steps.

S301. A routing apparatus receives data by using an input port, and determines a data bearer protocol attribute of the input port.

To implement routing of data of one or more networks, the routing apparatus in S301 receives the data by using the input port and determines the data bearer protocol attribute of the input port used to receive the data, so that the routing apparatus determines an attribute of the data based on the data bearer protocol attribute of the input port.

The routing apparatus may receive IP data by using an input port whose data bearer protocol attribute is the Ethernet protocol. The routing apparatus may receive IP data and/or I/Q data by using an input port whose data bearer protocol attribute is the CPRI protocol.

Before S301 is performed, the routing apparatus may configure one or more of parameters of the input port, such as a quantity of input ports, the data bearer protocol attribute of the input port, and a communication band of the input port. The routing apparatus may configure parameters of an input port by using a variety of methods. For example, the routing apparatus configures the parameters of the input port based on a static configuration command delivered by a communications system.

When the routing apparatus configures the input port, to avoid a case that transmission of the I/Q data is slow or interrupted because few port resources are configured by the routing apparatus for transmission of the I/Q data, the input port whose data bearer protocol attribute is the CPRI protocol is preferentially used to receive the I/Q data, to ensure that the routing apparatus can meet a transmission requirement of the communications system for the I/Q data.

When total bandwidth of a communication band of the input port whose data bearer protocol attribute is the CPRI protocol is greater than bandwidth of a communication band required by the routing apparatus for receiving the I/Q data, idle bandwidth in the total bandwidth of the communication band of the input port may be configured as bandwidth of a communication band used to receive the IP data, so as to reduce bandwidth waste caused by transmission of data in a single network and improve bandwidth utilization.

It should be noted that details of the parameters of the input port such as the quantity of input ports, the data bearer protocol attribute of the input port, and the communication band of the input port are determined based on an actual application requirement. This is not limited in this embodiment of this application.

In this embodiment, configuration cases of the input port of the routing apparatus are as follows.

Case 1: When there are one or more input ports for the routing apparatus, and a data bearer protocol attribute of each of the one or more input ports is the CPRI protocol, the routing apparatus may receive the IP data and/or the I/Q data by using the input port whose data bearer protocol attribute is the CPRI protocol.

In the case 1, any one of the one or more input ports whose data bearer protocol attribute is the CPRI protocol may have the following three configuration sub-cases: Sub-case 1: When the routing apparatus configures the communication band of the input port as a first band, the routing apparatus receives the IP data by using the first band of the input port.

Sub-case 2: When the routing apparatus configures the communication band of the input port as a second band, the routing apparatus receives the I/Q data by using the second band of the input port.

Sub-case 3: When the routing apparatus configures the communication band of the input port as the first band and the second band, the routing apparatus receives the IP data by using the first band of the input port, and receives the I/Q data by using the second band of the input port.

It should be noted that, for the plurality of input ports whose data bearer protocol attribute is the CPRI protocol and that are of the routing apparatus, configuration of the communication band of each of the plurality of input ports may be the same or may be different.

Based on the case 1, if communication bands of the one or more input ports whose data bearer protocol attribute is the CPRI protocol and that are of the routing apparatus include only the first band, the routing apparatus can receive only the IP data by using the input port, and in this case, the routing apparatus is applicable to a communications system that includes a network whose data bearer protocol is the Ethernet protocol. Based on the case 1, if communication bands of the one or more input ports whose data bearer protocol attribute is the CPRI protocol and that are of the routing apparatus include only the second band, the routing apparatus can receive only the I/Q data by using the input port, and in this case, the routing apparatus is applicable to a communications system that includes a network whose data bearer protocol is the CPRI protocol. Based on the case 1, if communication bands of the one or more input ports whose data bearer protocol attribute is the CPRI protocol and that are of the routing apparatus include the first band and the second band, the routing apparatus can receive the IP data and the I/Q data by using the input port, and in this case, the routing apparatus is applicable to a communications system in which a plurality of networks that uses different data bearer protocols are integrated, and the different data bearer protocols include the Ethernet protocol and the CPRI protocol. Therefore, when the data bearer protocol attributes of all the input ports of the routing apparatus are the CPRI protocol, to implement that the routing apparatus can receive the IP data and the I/Q data by using the input ports, at least one input port whose communication band including the first band and the second band needs to be included in the routing apparatus.

For example, it is assumed that the routing apparatus has three input ports, and the three input ports are respectively a port A, a port B, and a port C. A communication band of the port A includes the first band and the second band, a communication band of the port B includes only the second band, and a communication band of the port C includes only the first band. In this case, the routing apparatus may receive the IP data and the I/Q data by using an input port. The routing apparatus may be applicable to the communications system in which a plurality of networks that uses different data bearer protocols are integrated, or may be applicable to a communications system including one or more networks that use the Ethernet protocol, or may be applicable to a communications system including one or more networks that use the CPRI protocol.

Case 2: When there are one or more input ports for the routing apparatus, and a data bearer protocol attribute of each of the one or more input ports is the Ethernet protocol, the routing apparatus may receive the IP data by using the input port whose data bearer protocol attribute is the Ethernet protocol. In this case, the routing apparatus is applicable to a communications system that includes a network whose data bearer protocol is the Ethernet protocol.

Case 3: When there are a plurality of input ports for the routing apparatus, and the plurality of input ports include the input port whose data bearer protocol attribute is the CPRI protocol and the input port whose data bearer protocol attribute is the Ethernet protocol, the routing apparatus can receive the IP data and the I/Q data by using an input port. In this case, the routing apparatus is applicable to a communications system that includes a network whose data bearer protocol is the Ethernet protocol and a network whose data bearer protocol is the CPRI protocol.

It should be noted that in the case 3, for configuration of the input port whose data bearer protocol attribute is the CPRI protocol, refer to configuration of the input port whose data bearer protocol attribute is the CPRI protocol described in the three sub-cases in the case 1. Details are not described herein.

The method of receiving data by a routing apparatus in S301 includes: receiving, by the routing apparatus by using the input port, a first data packet including the data. After determining the data bearer protocol attribute of the input port, the routing apparatus uses a separation manner corresponding to the data bearer protocol attribute of the input port to separate the first data packet to obtain the data. When the data bearer protocol attribute of the input port is the CPRI protocol, the separation manner corresponding to the CPRI protocol is an IP over CPRI manner, or an I/Q over CPRI manner. When the data bearer protocol attribute of the input port is the Ethernet protocol, the separation manner corresponding to the Ethernet protocol is an IP over ETH manner.

The IP over CPRI separation manner is used to implement separation of the first data packet based on the CPRI protocol to obtain the IP data, the I/Q over CPRI separation manner is used to implement separation of the first data packet based on the CPRI protocol to obtain the I/Q data, and the IP over ETH separation manner is used to implement separation of the first data packet based on the Ethernet protocol to obtain the IP data.

In this way, the routing apparatus can receive data in a network, and also can receive data in a communications system in which a plurality of networks is integrated.

The method of determining the data bearer protocol attribute of the input port by the routing apparatus in S301 includes but is not limited to the following two methods.

Method 1: The routing apparatus pre-stores the data bearer protocol attribute corresponding to each input port when configuring the input port, and determines, based on the pre-stored correspondence, the data bearer protocol attribute of the input port for receiving the data.

Method 2: After receiving the data by using the input port, the routing apparatus determines the data bearer protocol attribute of the input port by detecting information that is carried by the input port and that is used to indicate the data bearer protocol attribute of the input port.

S302. The routing apparatus determines an attribute of the data based on the data bearer protocol attribute of the input port, where when the data bearer protocol attribute of the input port is the CPRI protocol, the attribute of the data is an IP attribute or an I/Q attribute, or when the data bearer protocol attribute of the input port is the Ethernet protocol, the attribute of the data is an IP attribute.

In S302, the routing apparatus may determine the attribute of the data based on the data bearer protocol attribute of the input port used to receive the data, so as to determine, in a subsequent step based on the attribute of the data, the data bearer protocol attribute of an output port used to output the data.

When the data bearer protocol attribute of the input port is the Ethernet protocol, the routing apparatus may determine the attribute of the data received by using the input port whose data bearer protocol attribute is the Ethernet protocol as the IP attribute. When the data bearer protocol attribute of the input port is the CPRI protocol, there may be the following three cases about determining the attribute of the data based on the data bearer protocol attribute of the input port.

Case 1: When the communication band of the input port includes only the first band, the routing apparatus may determine the attribute of the data received by using the first band as the IP attribute.

Case 2: When the communication band of the input port includes only the second band, the routing apparatus may determine the attribute of the data received by using the second band as the I/Q attribute.

Case 3: When the communication band of the input port includes the first band and the second band, the routing apparatus may determine the attribute of the data received by using the first band as the IP attribute and determine the attribute of the data received by using the second band as the I/Q attribute.

It should be noted that, in addition to the foregoing method for determining the attribute of the data based on the data bearer protocol attribute of the input port, the routing apparatus may determine the attribute of the data by using another method. For example, the routing apparatus obtains information about the attribute of the data recorded in a data packet of the data. When the information in the data packet of the data records that the attribute of the data is the IP attribute, the routing apparatus determines that the attribute of the data is the IP attribute, or when the information in the data packet of the data records that the attribute of the data is the I/Q attribute, the routing apparatus determines that the attribute of the data is the I/Q attribute.

S303. The routing apparatus determines, based on the attribute of the data, the data bearer protocol attribute of an output port used to output the data. When the attribute of the data is the IP attribute, the data bearer protocol attribute of the output port is the CPRI protocol or the Ethernet protocol. When the attribute of the data is the I/Q attribute, the data bearer protocol attribute of the output port is the CPRI protocol.

The output port and the input port may be different ports or a same port. When the output port and the input port are a same port, the port is a port in a duplex mode. A specific case in which the routing apparatus outputs the data by using the output port is similar to the specific case in which the routing apparatus receives the data by using the input port in S301. Details are not described herein.

In S303, the communication band of the output port whose data bearer protocol attribute is the CPRI protocol includes a third band and/or a fourth band, the third band is used to output the IP data, and the fourth band is used to output the I/Q data. Configuration of the communication band of the output port of the routing apparatus is similar to the configuration of the communication band of the input port described above. Details are not described herein.

In this case, when the communication band of the input port whose data bearer protocol attribute is the CPRI protocol includes only the third band, the routing apparatus can output the data with the IP attribute by using the third band. When the communication band of the input port whose data bearer protocol attribute is the CPRI protocol includes only the fourth band, the routing apparatus can output the data with the I/Q attribute by using the fourth band. When the communication band of the input port whose data bearer protocol attribute is the CPRI protocol includes the third band and the fourth band, the routing apparatus can output the data with the IP attribute by using the third band, and output the data with the I/Q attribute by using the fourth band.

The routing apparatus may include only one or more output ports whose data bearer protocol attribute is the CPRI protocol, or may include only one or more output ports whose data bearer protocol attribute is the Ethernet protocol, or may include an output port whose data bearer protocol attribute is the Ethernet protocol and an output port whose data bearer protocol attribute is the CPRI protocol. Configuration of the output port of the routing apparatus is similar to the configuration of the input port described above. Details are not described herein.

It should be noted that details of the parameters of the output port such as the quantity of output ports, the data bearer protocol attribute of the output port, and the communication band of the output port are determined by an actual application requirement. This is not limited in this embodiment of this application.

In S303, the routing apparatus determines the data bearer protocol attribute of the output port used to output the data based on the attribute of the data, so that the routing apparatus determines, in a subsequent step based on the data bearer protocol attribute of the output port, the output port that is used to output the data.

In S303, the I/Q data can only be output from the output port whose data bearer protocol attribute is the CPRI protocol. Therefore, when the attribute of the data is the I/Q attribute, the routing apparatus determines the data bearer protocol attribute of the output port as the CPRI protocol.

In S303, the I/Q data can be output from the output port whose data bearer protocol attribute is the CPRI protocol, or can be output from the output port whose data bearer protocol attribute is the Ethernet protocol. Therefore, when the attribute of the data is the IP attribute, there may be the following several cases in which the routing apparatus determines the data bearer protocol attribute of the output port used to output the data.

Case 1: When there is only the output port whose data bearer protocol attribute is the CPRI protocol, and the communication band of the output port includes the third band, the data bearer protocol attribute of the output port corresponding to the IP data is the CPRI protocol.

Case 2: When there is an output port whose data bearer protocol attribute is the CPRI protocol and an output port whose data bearer protocol attribute is the Ethernet protocol, and the communication band of the output port whose data bearer protocol attribute is the CPRI protocol does not include the third band, the data bearer protocol attribute of the output port corresponding to the IP data is the Ethernet protocol.

Case 3: When there is an output port whose data bearer protocol attribute is the CPRI protocol and an output port whose data bearer protocol attribute is the Ethernet protocol, and the communication band of the output port whose data bearer protocol attribute is the CPRI protocol includes the third band, the data bearer protocol attribute of the output port corresponding to the IP data is the Ethernet protocol or the CPRI protocol.

S304. The routing apparatus determines, based on the data bearer protocol attribute of the output port, the output port used to output the data, and outputs the data by using the determined output port.

In S304, the routing apparatus determines, based on the data bearer protocol attribute of the output port, the output port whose data bearer protocol attribute is consistent with the data bearer protocol attribute of the output port as the output port used to output the data, and outputs data by using the determined output port, to implement the output of data with one or more attributes, so that the routing apparatus can implement data routing in a communications system in which a plurality of networks that uses different data bearer protocols are integrated.

The method for outputting the data by the routing apparatus by using the determined output port in S304 includes that the routing apparatus performs packet assembly on the data in a packet assembly manner corresponding to the data bearer protocol attribute that is corresponding to the data, to obtain a second data packet including the data, and outputs the second data packet by using the determined output port, so as to implement data routing in one or more networks, in particular, to output the data in the future communications system in which a plurality of networks that uses different data bearer protocols are integrated.

When the data bearer protocol attribute of the output port is the CPRI protocol, the packet assembly manner corresponding to the CPRI protocol is the IP over CPRI or the I/Q over CPRI. When the data bearer protocol attribute of the output port is the Ethernet protocol, the packet assembly manner corresponding to the Ethernet protocol is the IP over ETH.

The packet assembly manner of the IP over CPRI is used to implement packet assembly of the IP data based on the CPRI protocol to obtain the second data packet, the packet assembly manner of the I/Q over CPRI is used to implement packet assembly of the I/Q data based on the CPRI protocol to obtain the second data packet, and the packet assembly manner of the IP over ETH is used to implement packet assembly of the IP data based on the Ethernet protocol to obtain the second data packet.

In this way, the routing apparatus can implement output of data in a network, or output of data in a communications system in which a plurality of networks are integrated.

In S304, when there is one output port with the data bearer protocol attribute corresponding to the data, the routing apparatus determines the output port as the output port used to output the data.

In S304, when there are a plurality of output ports with the data bearer protocol attribute corresponding to the data, the method in which the routing apparatus determines the output port used to output the data includes the following two cases.

Case 1: In S304, when there are a plurality of output ports with the data bearer protocol attribute corresponding to the I/Q data, the routing apparatus determines, in the plurality of output ports based on a pre-configured correspondence between an input port used to receive the I/Q data and an output port, the output port used to output the I/Q data.

Before S304 is performed, the routing apparatus preconfigures the correspondence between an input port used to receive the I/Q data and an output port because a bandwidth size of the communication band that is required for each transmission of the I/Q data is easily estimated and the bandwidth size of the communication band that is required for each transmission of the I/Q data is relatively fixed. For example, the routing apparatus may configure the correspondence between the input port used to receive the I/Q data and the output port based on configuration information of the I/Q data delivered by a communications system.

Case 2: In S304, when there is a plurality of output ports with the data bearer protocol attribute corresponding to the IP data, the routing apparatus determines, in the plurality of output ports based on a destination address of the IP data, the output port used to output the IP data.

In the case 2, there are a plurality of output ports with the data bearer protocol attribute corresponding to the IP data, and the plurality of output ports include the following three cases: the first case is that the plurality of output ports are a plurality of output ports whose data bearer protocol attribute is the CPRI protocol, the second case is that the plurality of output ports are a plurality of output ports whose data bearer protocol attribute is the Ethernet protocol, and the third case is that the plurality of output ports include an output port whose data bearer protocol attribute is the Ethernet protocol and an output port whose data bearer protocol attribute is the CPRI protocol.

There may be a plurality of methods of determining, by the routing apparatus based on the destination address of the IP data, the output port used to output the IP data. For example, the routing apparatus may determine, based on a destination address of Address Resolution Protocol (ARP) information delivered by the communications system, the output port used to output the IP data. For another example, the routing apparatus may determine, based on the destination address of the IP data received each time, the output port used to output the IP data.

The method in which the routing apparatus determines, in the plurality of output ports based on the destination address of the ARP information delivered by the communications system, the output port used to output the IP data is used as an example, and the method includes the following steps.

Step 1: The routing apparatus receives, by using the input port, the ARP information delivered by the communications system.

Step 2: The routing apparatus parses the information to obtain a destination media access control (MAC) address included in the information, and sends the parsed ARP information to Route.

Step 3: The routing apparatus determines, based on the destination MAC address of the ARP information, whether there is an identifier of an output port corresponding to the destination MAC address in the routing apparatus, where the output port corresponding to the destination MAC address is an output port used when the ARP information is output to a peer device corresponding to the destination MAC address. If there is no identifier of the output port corresponding to the destination MAC address in the routing apparatus, step 4 is performed. If there is an identifier of the output port corresponding to the destination MAC address in the routing apparatus, step 5 is performed.

Step 4: The routing apparatus performs network addressing based on the destination MAC address of the ARP information, determines and records the output port used to output the IP data.

Step 5: The routing apparatus determines the output port corresponding to the identifier of the output port as the output port used to output the IP data.

A method in which the routing apparatus determines, in the plurality of output ports based on a destination address included in the IP data received each time, the output port used to output the IP data is used as an example. The method includes: determining, by the routing apparatus based on the destination address included in the IP data received each time, whether there is an identifier of an output port corresponding to the destination address in the routing apparatus. If there is no identifier of the output port corresponding to the destination address in the routing apparatus, the routing apparatus performs network addressing based on the destination address included in the IP data received each time, determines and records the output port used to output the IP data. If there is an identifier of the output port corresponding to the destination address in the routing apparatus, the routing apparatus determines the output port corresponding to the identifier of the output port as the output port used to output the IP data. The output port corresponding to the destination address is the output port used when the IP data is output to the peer device corresponding to the destination MAC address.

It should be noted that, if there are a plurality of output ports with the data bearer protocol attribute corresponding to the IP data, in addition to the method in which the routing apparatus determines, in the plurality of output ports based on the destination address of the ARP information delivered by the communications system or based on the destination address of the IP data received each time, the output port used to output the data, another method may be used to determine, in the plurality of output ports, the output port used to output the data. For example, the routing apparatus determines, in the plurality of output ports, an output port with largest bandwidth of the included communication band as the output port used to output the data.

In an existing communications system, network architectures of different networks are not compatible. Assuming that a future communications system in which two networks including a network A and a network B are integrated, and if the network A in the future communications system in which a plurality of networks are integrated needs to evolve to a network C that is not included in this communications system, a network architecture of the network A needs to be reconstructed to overcome network architecture incompatibility between the network A and the network C. However, reconstruction of the original network architecture may be difficult and high-cost during network architecture evolution. If the network A and the network B in the communications system route data by using the routing apparatus provided in this embodiment of this application, when the network A in the future communications system in which a plurality of networks are integrated needs to evolve to the network C that is not included in the communications system, the routing apparatus in the network architecture of the network A does not need to be reconstructed because the routing apparatus can route the data of the network A and the network C, thereby reducing difficulties and costs of reconstruction of the network architecture during network evolution.

The embodiment of this application provides the data routing method. The routing apparatus receives the data by using the input port, determines the data bearer protocol attribute of the input port, and determines the attribute of the data based on the data bearer protocol attribute of the input port. When the data bearer protocol attribute of the input port is the CPRI protocol, the attribute of the data is an IP attribute or an I/Q attribute. When the data bearer protocol attribute of the input port is the Ethernet protocol, the attribute of the data is the IP attribute. The routing apparatus determines, based on the attribute of the data, the data bearer protocol attribute of an output port used to output the data. When the attribute of the data is the IP attribute, the data bearer protocol attribute of the output port is the CPRI protocol or the Ethernet protocol. When the attribute of the data is the I/Q attribute, the data bearer protocol attribute of the output port is the CPRI protocol. The routing apparatus determines, based on the data bearer protocol attribute of the output port, the output port used to output the data, and outputs the data by using the determined output port, so as to route the data with one or more attributes by using the routing apparatus, so that the routing apparatus can implement data routing in a communications system of one or more networks. The plurality of networks may be networks that use a same data bearer protocol attribute, or may be networks that use different data bearer protocol attributes. In the method provided in this embodiment, the routing apparatus can implement data routing in the communications system of one or more networks, in particular, can implement data routing in a future communications system in which a plurality of networks that use different data bearer protocols are integrated, so that a flexible networking requirement of the future communications system in which a plurality of networks are integrated is met, a network architecture is simplified, and network device deployment costs are reduced.

Figure 4:
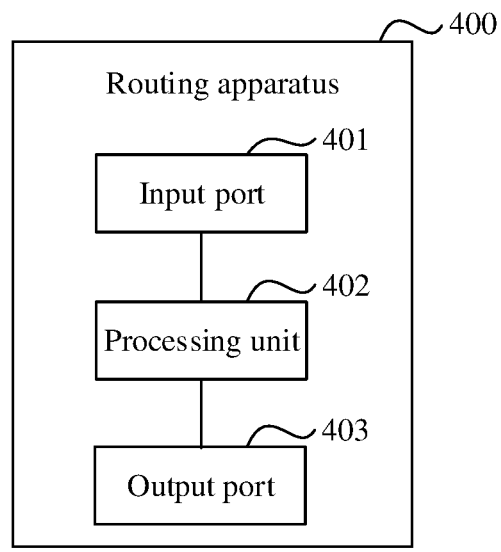
FIG. 4 is a schematic structural diagram of a routing apparatus according to an embodiment of this application.

Based on a same application concept, an embodiment of this application further provides a routing apparatus. The routing apparatus may use the method provided in the embodiment corresponding to FIG. 3. Referring to FIG. 4, a routing apparatus 400 includes an input port 401, a processing unit 402, and an output port 403, where the input port 401 is configured to receive data; the processing unit 402 is configured to: determine a data bearer protocol attribute of the input port 401; and determine, based on the data bearer protocol attribute of the input port 401, an attribute of the data received by the input port 401, where when the data bearer protocol attribute of the input port 401 is the common public radio interface (CPRI) protocol, the attribute of the data is an Internet Protocol (IP) attribute or an in-phase/quadrature (I/Q) attribute, or when the data bearer protocol attribute of the input port 401 is the Ethernet protocol, the attribute of the data is the IP attribute; determine, based on the attribute of the data, the data bearer protocol attribute of the output port 403 used to output the data, where when the attribute of the data is the IP attribute, the data bearer protocol attribute of the output port 403 is the CPRI protocol or the Ethernet protocol, or when the attribute of the data is the I/Q attribute, the data bearer protocol attribute of the output port 403 is the CPRI protocol; determine, based on the data bearer protocol attribute of the output port 403, the output port 403 used to output the data; and send the data received from the input port 401 to the determined output port 403; and the output port 403 is configured to output the data sent by the processing unit 402.

In the foregoing apparatus, the input port 401 and the output port 403 may be a same port or may be different ports. There may be one or more input ports 401 and one or more output ports 403.

Figure 5:
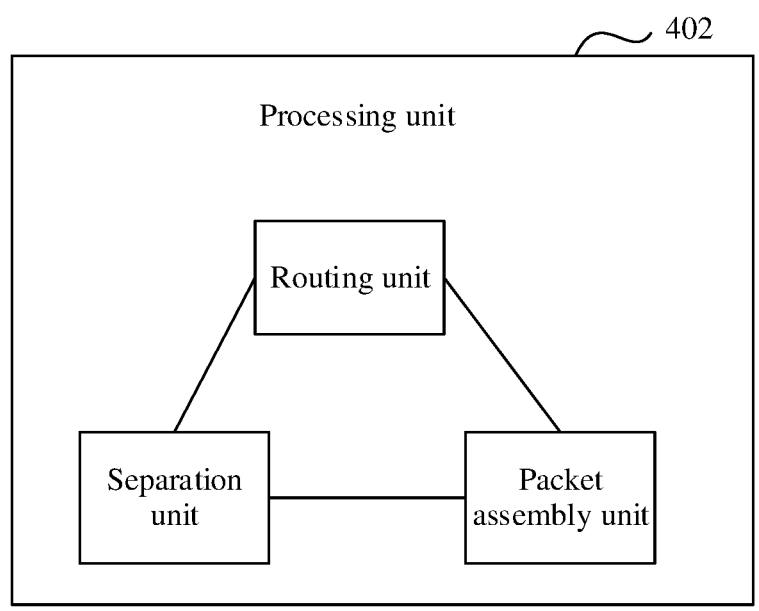
FIG. 5 is a schematic structural diagram of a processing unit according to an embodiment of this application.

In the foregoing apparatus, the processing unit 402 may be divided into a route unit (Route), a separation unit (DeMUX), and a packet assembly unit (MUX) based on a logical function, which are shown in FIG. 5.

In a possible embodiment, the input port 401 may be specifically configured to receive a first data packet including the data; and accordingly, the processing unit 402 may be further configured to: after determining the data bearer protocol attribute of the input port 401, and before sending, to the determined output port 403, the data received from the input port 401, separate the first data packet in a separation manner corresponding to the data bearer protocol attribute of the input port 401 to obtain the data.

It should be noted that the processing unit 402 may implement, by using the separation unit, a function of separating the first data packet to obtain the data, and the processing unit 402 may also implement the foregoing function in another manner. This is not limited in this embodiment of this application.

In a possible embodiment, a communication band of the input port 401 whose data bearer protocol attribute is the CPRI protocol may include only a first band, or may include only a second band, or may include the first band and the second band. The first band may be used to receive data with the IP attribute, and the second band may be used to receive data with the I/Q attribute.

Correspondingly, when determining the attribute of the data based on the data bearer protocol attribute of the input port 401, the processing unit 402 may be specifically configured to: when receiving the data by using the first band, determine the attribute of the data as the IP attribute; or when receiving the data by using the second band, determine the attribute of the data as the I/Q attribute.

It should be noted that the processing unit 402 may implement, by using the separation unit, a function of determining the attribute of the data based on the data bearer protocol attribute of the input port 401, and the processing unit 402 may also implement the foregoing function in another manner. This is not limited in this embodiment of this application.

In a possible embodiment, a communication band of the output port 403 whose data bearer protocol attribute is the CPRI protocol may include only a third band, or may include only a fourth band, or may include the third band and the fourth band. The third band may be used to output data with the IP attribute, and the fourth band may be used to output data with the I/Q attribute.

Accordingly, when the attribute of the data is the IP attribute, the data bearer protocol attribute of the output port 403 is the CPRI protocol or the Ethernet protocol, which may specifically include the following cases.

Case 1: When there is only the output port 403 whose data bearer protocol attribute is the CPRI protocol, and the communication band of the output port 403 includes the third band, the data bearer protocol attribute of the output port 403 corresponding to the data with the IP attribute is the CPRI protocol.

Case 2: When there is an output port 403 whose data bearer protocol attribute is the CPRI protocol and an output port 403 whose data bearer protocol attribute is the Ethernet protocol, and the communication band of the output port 403 whose data bearer protocol attribute is the CPRI protocol does not include the third band, the data bearer protocol attribute of the output port 403 corresponding to the data with the IP attribute is the Ethernet protocol.

Case 3: When there is an output port 403 whose data bearer protocol attribute is the CPRI protocol and an output port 403 whose data bearer protocol attribute is the Ethernet protocol, and the communication band of the output port 403 whose data bearer protocol attribute is the CPRI protocol includes the third band, the data bearer protocol attribute of the output port 403 corresponding to the data with the IP attribute is the Ethernet protocol or the CPRI protocol.

In a possible embodiment, when determining, based on the data bearer protocol attribute of the output port 403, the output port 403 used to output the data, the processing unit 402 may be specifically configured to implement the following two cases.

Case 1: When there are a plurality of output ports 403 with the data bearer protocol attribute corresponding to the data with the IP attribute, the processing unit 402 may determine, in the plurality of output ports 403 based on a destination address of the data with the IP attribute, the output port 403 used to output the data with the IP attribute.

Case 2: When there are a plurality of output ports 403 with the data bearer protocol attribute corresponding to the data with the I/Q attribute, the processing unit 402 may determine, in the plurality of output ports 403 based on a pre-configured correspondence between the input port 401 used to receive the data with the I/Q attribute and the output port 403, the output port 403 used to output the data with the I/Q attribute.

It should be noted that the processing unit 402 may implement, by using the packet assembly unit, a function of determining, based on the data bearer protocol attribute of the output port 403, the output port 403 used to output the data, and the processing unit 402 may also implement the foregoing function in another manner. This is not limited in this embodiment of this application.

In a possible embodiment, the processing unit 402 may be further configured to perform packet assembly on the data in a packet assembly manner corresponding to the data bearer protocol attribute that is corresponding to the data, to obtain a second data packet including the data; and accordingly, the output port 403 may be specifically configured to output the second data packet.

The processing unit 402 may implement, by using the packet assembly unit, a function of performing packet assembly on the data in the packet assembly manner corresponding to the data bearer protocol attribute that is corresponding to the data, to obtain the second data packet including the data, and the processing unit 402 may also implement the foregoing function in another manner. This is not limited in this embodiment of this application.

In a possible embodiment, the input port 401 whose data bearer protocol attribute is the CPRI protocol may be preferentially configured to receive the data with the I/Q attribute; and the output port 403 whose data bearer protocol attribute is the CPRI protocol may be preferentially configured to send the data with the I/Q attribute.

It should be noted that, in this embodiment of this application, unit division is an example, and is merely a logical function division. In actual implementation, another division manner may be used. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device, and or the like) or a processor to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 6:
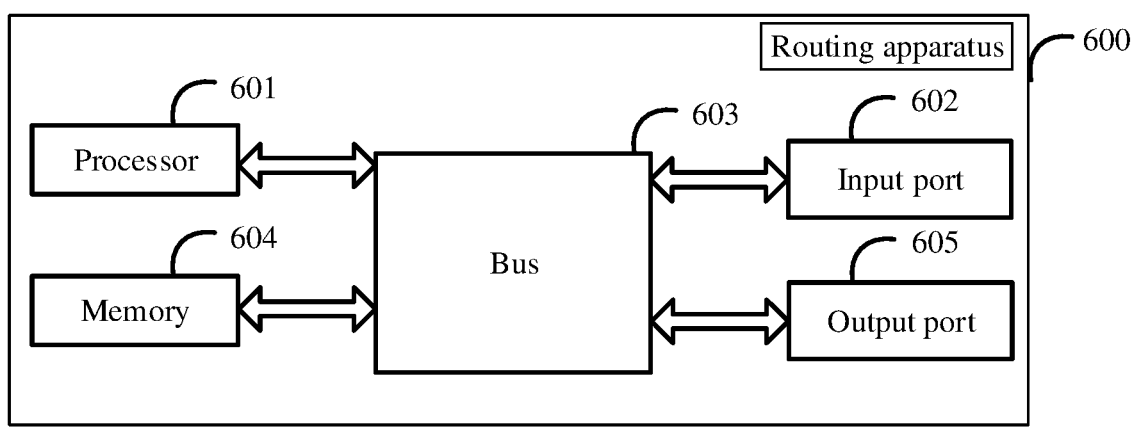
FIG. 6 is a schematic structural diagram of another routing apparatus according to an embodiment of this application.

Based on a same application concept, an embodiment of this application further provides a routing apparatus. The routing apparatus may use the method provided in the embodiment corresponding to FIG. 3, and may be a same apparatus as the routing apparatus shown in FIG. 4. Referring to FIG. 6, the routing apparatus 600 includes a processor 601, an input port 602, a bus 603, a memory 604, and an output port 605, where the processor 601 is configured to read a program in the memory 604, to execute the following process: the processor 601 is configured to control the input port 602 to receive data; the processor 601 is further configured to: determine a data bearer protocol attribute of the input port 602; and determine, based on the data bearer protocol attribute of the input port 602, an attribute of the data received by the input port 602, where when the data bearer protocol attribute of the input port 602 is the common public radio interface (CPRI) protocol, the attribute of the data is an Internet Protocol IP attribute or an in-phase/quadrature (I/Q) attribute, or when the data bearer protocol attribute of the input port 602 is the Ethernet protocol, the attribute of the data is the IP attribute; determine, based on the attribute of the data, the data bearer protocol attribute of the output port 605 used to output the data, where when the attribute of the data is the IP attribute, the data bearer protocol attribute of the output port 605 is the CPRI protocol or the Ethernet protocol, or when the attribute of the data is the I/Q attribute, the data bearer protocol attribute of the output port 605 is the CPRI protocol; determine, based on the data bearer protocol attribute of the output port 605, the output port 605 used to output the data; and send the data received from the input port 602 to the determined output port 605; and the processor 601 is further configured to control the output port 605 to output the data.

The input port 602 and the output port 605 may be a same port or may be different ports. There may be one or more input ports 602, and one or more output ports 605.

In a possible embodiment, the processor 601 may be specifically configured to control the input port 602 to receive a first data packet including the data when controlling the input port 602 to receive the data; and accordingly, the processor 601 may be further configured to: after determining the data bearer protocol attribute of the input port 602, and before sending, to the determined output port 605, the data received from the input port 602, separate the first data packet in a separation manner corresponding to the data bearer protocol attribute of the input port 602 to obtain the data.

In a possible embodiment, a communication band of the input port 602 whose data bearer protocol attribute is the CPRI protocol includes a first band and/or a second band, the first band is used to receive the data with the IP attribute, and the second band is used to receive the data with the I/Q attribute.

Correspondingly, when determining the attribute of the data based on the data bearer protocol attribute of the input port 602, the processor 601 may be specifically configured to: when receiving the data by using the first band, determine the attribute of the data as the IP attribute; or when receiving the data by using the second band, determine the attribute of the data as the I/Q attribute.

In a possible embodiment, a communication band of the output port 605 whose data bearer protocol attribute is the CPRI protocol includes a third band and/or a fourth band, the third band is used to output the data with the IP attribute, and the fourth band is used to output the data with the I/Q attribute.

Accordingly, when the attribute of the data is the IP attribute, the data bearer protocol attribute of the output port 605 is the CPRI protocol or the Ethernet protocol, which may specifically include the following cases.

Case 1: When there is only the output port 605 whose data bearer protocol attribute is the CPRI protocol, and the communication band of the output port 605 includes the third band, the data bearer protocol attribute of the output port 605 corresponding to the data with the IP attribute is the CPRI protocol.

Case 2: When there is an output port 605 whose data bearer protocol attribute is the CPRI protocol and an output port 605 whose data bearer protocol attribute is the Ethernet protocol, and the communication band of the output port 605 whose data bearer protocol attribute is the CPRI protocol does not include the third band, the data bearer protocol attribute of the output port 605 corresponding to the data with the IP attribute is the Ethernet protocol.

Case 3: When there is an output port 605 whose data bearer protocol attribute is the CPRI protocol and an output port 605 whose data bearer protocol attribute is the Ethernet protocol, and the communication band of the output port 605 whose data bearer protocol attribute is the CPRI protocol includes the third band, the data bearer protocol attribute of the output port 605 corresponding to the data with the IP attribute is the Ethernet protocol or the CPRI protocol.

In a possible embodiment, when determining, based on the data bearer protocol attribute of the output port 605, the output port 605 used to output the data, the processor 601 may be specifically configured to implement the following two cases.

Case 1: When there are a plurality of output ports 605 with the data bearer protocol attribute corresponding to the data with the IP attribute, the processor 601 determines, in the plurality of output ports 605 based on a destination address of the data with the IP attribute, the output port 605 used to output the data with the IP attribute.

Case 2: When there are a plurality of output ports 605 with the data bearer protocol attribute corresponding to the data with the I/Q attribute, the processor 601 determines, in the plurality of output ports 605 based on a pre-configured correspondence between the input port 602 used to receive the data with the I/Q attribute and the output port 605, the output port 605 used to output the data with the I/Q attribute.

In a possible embodiment, the processor 601 may be further configured to perform packet assembly on the data in a packet assembly manner corresponding to the data bearer protocol attribute that is corresponding to the data to obtain a second data packet including the data; and accordingly, when controlling the output port 605, the processor 601 may be specifically configured to control the output port 605 to output the second data packet.

In a possible embodiment, the input port 602 whose data bearer protocol attribute is the CPRI protocol may be preferentially configured to receive the data with the I/Q attribute; and the output port 605 whose data bearer protocol attribute is the CPRI protocol may be preferentially configured to send the data with the I/Q attribute.

The input port 602 may be configured to receive the data under control of the processor 601. The output port 605 may be configured to send the data under control of the processor 601.

The processor 601, the input port 602, the memory 604, and the output port 605 are connected to each other by using the bus 603. The bus 603 may be a peripheral component interconnect (PCI) bus, an extended industry standard architecture (EISA) bus, or the like. The bus may be classified into an address bus, a data bus, a control bus, and the like.

In FIG. 6, a bus architecture may include any quantity of interconnected buses and bridges, and specifically links various circuits of one or more processors represented by the processor 601 and a memory represented by the memory 604. The bus architecture may further link together various other circuits such as a peripheral device, a voltage regulator, and a power management circuit. These are all well known in the art, and therefore are not further described in this specification. A bus interface provides an interface. The input port 602 and the output port 605 may be a plurality of components. To be specific, the input port 602 and the output port 605 include a transmitter and a transceiver, and provide a unit configured to communicate with various other apparatuses on a transmission medium. The processor 601 is responsible for bus architecture management and general processing. The memory 604 may store data used by the processor 601 when the processor 601 performs an operation.

Optionally, the processor 601 may be a central processing unit, an application-specific integrated circuit (ASIC), a field-programmable gate array (FPGA), or a complex programmable logical device (CPLD).

An embodiment of this application further provides a computer storage medium, storing a computer program, and the computer program may perform the method performed by the routing apparatus in the foregoing embodiment when being invoked by a processor.

An embodiment of this application provides a routing apparatus. The routing apparatus routes data with one or more attributes, and then the routing apparatus can implement data routing in a communications system of one or more networks, in particular, can implement data routing in a future communications system in which a plurality of networks that use different data bearer protocols are integrated, so that a flexible networking requirement of the future communications system in which a plurality of networks are integrated is met, a network architecture is simplified, and network device deployment costs are reduced.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope defined by the following claims and their equivalent technologies.

What is claimed is:

1. A method, comprising:
    receiving, by an apparatus, data using an input port, and determining a data bearer protocol attribute of the input port;
    determining, by the apparatus, an attribute of the data based on the data bearer protocol attribute of the input port, wherein:
        when the data bearer protocol attribute of the input port is a common public radio interface (CPRI) protocol, the attribute of the data is an Internet Protocol (IP) attribute or an in-phase/quadrature (I/Q) attribute; or
        when the data bearer protocol attribute of the input port is an Ethernet protocol, the attribute of the data is an IP attribute;
    determining, by the apparatus based on the attribute of the data, a data bearer protocol attribute of an output port to be used to output the data, wherein:
        when the attribute of the data is the IP attribute, the data bearer protocol attribute of the output port to be used to output the data is determined to be the CPRI protocol or the Ethernet protocol; or
        when the attribute of the data is the I/Q attribute, the data bearer protocol attribute of the output port to be used to output the data is determined to be the CPRI protocol;
    determining, by the apparatus based on the data bearer protocol attribute of the output port to be used to output the data, the output port to be used to output the data; and
    outputting the data using the determined output port.

2. The method according to claim 1, wherein receiving, by the apparatus, the data using the input port comprises:
    receiving, by the apparatus using the input port, a first data packet comprising the data; and
    wherein after determining the data bearer protocol attribute of the input port, the method further comprises:
    separating, by the apparatus, the first data packet in a separation manner to obtain the data, wherein the separation manner corresponds to the data bearer protocol attribute of the input port.

3. The method according to claim 1, wherein the data bearer protocol attribute of the input port is the CPRI protocol, and a communication band of the input port comprises:
    a first band, wherein the first band is used to receive the data, and the attribute of the data is the IP attribute; or
    a second band, wherein the second band is used to receive the data, and the attribute of the data is the I/Q attribute.

4. The method according to claim 3, wherein determining, by the apparatus, the attribute of the data based on the data bearer protocol attribute of the input port comprises:
    when the data is received using the first band, determining, by the apparatus, the attribute of the data to be the IP attribute; or
    when the data is received using the second band, determining, by the apparatus, the attribute of the data to be the I/Q attribute.

5. The method according to claim 1, wherein the data bearer protocol attribute of the output port to be used to output the data is the CPRI protocol, and a communication band of the output port comprises:
    a third band, wherein the third band is used to output the data when the attribute of the data is the IP attribute; or
    a fourth band, wherein the fourth band is used to output the data when the attribute of the data is the I/Q attribute.

6. The method according to claim 5, wherein when the attribute of the data is the IP attribute, the data bearer protocol attribute of the output port to be used to output the data is determined to be the CPRI protocol or the Ethernet protocol comprises:
    when the output port is the only output port comprised in the apparatus whose data bearer protocol attribute is the CPRI protocol, the communication band of the output port comprises the third band, and the attribute of the data is the IP attribute, the data bearer protocol attribute of the output port to be used to output the data is determined to be the CPRI protocol;
    when the apparatus comprises a first output port whose data bearer protocol attribute is the CPRI protocol, and a second output port whose data bearer protocol attribute is the Ethernet protocol, the communication band of the first output port does not comprise the third band, and the attribute of the data is the IP attribute, the data bearer protocol attribute of the output port to be used to output the data is determined to be the Ethernet protocol; or
    when the apparatus comprises a first output port whose data bearer protocol attribute is the CPRI protocol, and a second output port whose data bearer protocol attribute is the Ethernet protocol, the communication band of the first output port comprises the third band, and the attribute of the data is the IP attribute, the data bearer protocol attribute of the output port to be used to output the data is determined to be the Ethernet protocol or the CPRI protocol.

7. The method according to claim 1, wherein determining, by the apparatus, based on the data bearer protocol attribute of the output port to be used to output the data, the output port to be used to output the data comprises:

when the apparatus comprises a plurality of output ports having a data bearer protocol attribute corresponding to the attribute of the data, and the attribute of the data is the IP attribute, determining, by the apparatus from among the plurality of output ports and based on a destination address of the data, the output port to be used to output the data; or when the apparatus comprises a plurality of output ports with the data bearer protocol attribute corresponding to the attribute of the data, and the attribute of the data is the I/Q attribute, determining, by the apparatus from among the plurality of output ports based on a preconfigured correspondence between the input port and the output port to be used to output the data, the output port to be used to output the data.

8. The method according to claim 1, wherein outputting, by the apparatus, the data using the output port comprises:

performing, by the apparatus, packet assembly on the data in a packet assembly manner corresponding to the data bearer protocol attribute of the input port, to obtain a second data packet comprising the data; and outputting, by the apparatus, the second data packet.

9. The method according to claim 1, wherein the data attribute is the I/Q attribute, and the input port is preferentially configured to receive data having an attribute of the data that is the I/Q attribute; and the data bearer protocol attribute of the output port is the CPRI protocol, and the output port is preferentially configured to send data having an attribute of the data that is the I/Q attribute.

10. An apparatus, comprising:
an input port, configured to receive data;
an output port;
a processor; and
a non-transitory computer-readable storage medium storing a program to be executed by the processor, the program including instructions for:
determining a data bearer protocol attribute of the input port; and
determining, based on the data bearer protocol attribute of the input port, an attribute of the data received by the input port, wherein:
when the data bearer protocol attribute of the input port is a common public radio interface (CPRI) protocol, the attribute of the data is an Internet Protocol (IP) attribute or an in-phase/quadrature (I/Q) attribute; or
when the data bearer protocol attribute of the input port is an Ethernet protocol, the attribute of the data is an IP attribute;
determine, based on the attribute of the data, a data bearer protocol attribute of the output port to be used to output the data, wherein:
when the attribute of the data is the IP attribute, the data bearer protocol attribute of the output port to be used to output the data is determined to be the CPRI protocol or the Ethernet protocol; or
when the attribute of the data is the I/Q attribute, the data bearer protocol attribute of the output port to be used to output the data is determined to be the CPRI protocol;
determine, based on the data bearer protocol attribute of the output port to be used to output the data, the output port used to be used to output the data; and
send, to the determined output port, the data received from the input port; and
wherein the output port is configured to output the data.

11. The apparatus according to claim 10, wherein the input port is configured to receive a first data packet comprising the data; and wherein the program further includes instructions for:
after determining the data bearer protocol attribute of the input port, and before sending, to the determined output port, the data received from the input port, separate the first data packet in a separation manner to obtain the data, wherein the separation manner corresponds to the data bearer protocol attribute of the input port.

12. The apparatus according to claim 10, wherein the data bearer protocol attribute of the input port is the CPRI protocol, and a communication band of the input port comprises:

a first band, wherein the first band is used to receive the data, and the attribute of the data is the IP attribute; or a second band, wherein the second band is used to receive the data, and the attribute of the data is the I/Q attribute.

13. The apparatus according to claim 12, wherein the instructions for determining the attribute of the data based on the data bearer protocol attribute of the input port comprise instructions for:

when the data is received using the first band, determine the attribute of the data to be the IP attribute; or when the data is received using the second band, determine the attribute of the data to be the I/Q attribute.

14. The apparatus according to claim 10, wherein the data bearer protocol attribute of the output port to be used to output the data is the CPRI protocol, and a communication band of the output port comprises:

a third band, wherein the third band is used to output the data when the attribute of the data is the IP attribute; or a fourth band, wherein the fourth band is used to output the data when the attribute of the data is the I/Q attribute.

15. The apparatus according to claim 14, wherein when the attribute of the data is the IP attribute, the data bearer protocol attribute of the output port to be used to output the data is determined to be the CPRI protocol or the Ethernet protocol comprises:

when the output port is the only output port comprised in the apparatus whose data bearer protocol attribute is the CPRI protocol, the communication band of the output port comprises the third band, and the attribute of the data is the IP attribute, the data bearer protocol attribute of the output port to be used to output the data is determined to be the CPRI protocol;

when the apparatus comprises a first output port whose data bearer protocol attribute is the CPRI protocol and a second output port whose data bearer protocol attribute is the Ethernet protocol, the communication band of the first output port does not comprise the third band, and the attribute of the data is the IP attribute, the data bearer protocol attribute of the output port to be used to output the data is the Ethernet protocol; or when the apparatus comprises a first output port whose data bearer protocol attribute is the CPRI protocol and a second output port whose data bearer protocol attribute is the Ethernet protocol, the communication band of the first output port comprises the third band, and the attribute of the data is the IP attribute, the data bearer protocol attribute of the output port to be used to output the data is the Ethernet protocol or the CPRI protocol.

16. The apparatus according to claim 10, wherein the instructions for determining, based on the data bearer protocol attribute of the output port to be used to output the data, the output port to be used to output the data comprise instructions for:

when the apparatus comprises a plurality of output ports having a data bearer protocol attribute corresponding to the attribute of the data, and the attribute of the data is the IP attribute, determining, from among the plurality of output ports based on a destination address of the data, the output port to be used to output the data; or when there is a plurality of output ports having a data bearer protocol attribute corresponding to the attribute of the data, and the attribute of the data is the I/Q attribute, determining, from among the plurality of output ports based on a pre-configured correspondence between the input port and the output port to be used to output the data, the output port used to output the data.

17. The apparatus according to claim 10, wherein the program further includes instructions for:

performing packet assembly on the data in a packet assembly manner corresponding to the data bearer protocol attribute of the input port, to obtain a second data packet comprising the data; and wherein the output port is configured to output the second data packet.

18. The apparatus according to claim 10, wherein the attribute of the data is the I/Q attribute, the data bearer protocol attribute of the input port is the CPRI protocol, and the input port is preferentially configured to receive data having an attribute of the data that is the I/Q attribute; and wherein the data bearer protocol attribute of the output port to be used to output the data is the CPRI protocol, and the output port is preferentially configured to send data having an attribute of the data that is the I/Q attribute.

19. A computer program product stored in a non-transitory medium, comprising instructions which, when executed by a computer, cause the computer to:

receive data using an input port;

determine a data bearer protocol attribute of the input port;

determine an attribute of the data based on the data bearer protocol attribute of the input port, wherein:

when the data bearer protocol attribute of the input port is a common public radio interface (CPRI) protocol, the attribute of the data is an Internet Protocol (IP) attribute or an in-phase/quadrature (I/Q) attribute; or when the data bearer protocol attribute of the input port is an Ethernet protocol, the attribute of the data is an IP attribute;

determine the data bearer protocol attribute of an output port to be used to output the data based on the attribute of the data, wherein:

when the attribute of the data is the IP attribute, the data bearer protocol attribute of the output port is determined to be the CPRI protocol or the Ethernet protocol; or when the attribute of the data is the I/Q attribute, the data bearer protocol attribute of the output port is determined to be the CPRI protocol;

determine the output port to be used to output the data based on the data bearer protocol attribute of the output port; and output the data using the determined output port.

* * * * *